(12) United States Patent
Michalak

(10) Patent No.: US 10,780,799 B2
(45) Date of Patent: Sep. 22, 2020

(54) VEHICLE SEAT AND VEHICLE

(71) Applicant: Adient Luxembourg Holding S.à r.l., Luxembourg (LU)

(72) Inventor: Eric Michalak, Canton, MI (US)

(73) Assignee: Adient Luxembourg Holding S.à r.l., Luxembourg (LU)

( * ) Notice: Subject to any disclaimer, the term of this patent is extended or adjusted under 35 U.S.C. 154(b) by 0 days.

(21) Appl. No.: 16/330,195

(22) PCT Filed: Sep. 5, 2017

(86) PCT No.: PCT/EP2017/072175
§ 371 (c)(1),
(2) Date: Mar. 4, 2019

(87) PCT Pub. No.: WO2018/042049
PCT Pub. Date: Mar. 8, 2018

(65) Prior Publication Data
US 2019/0210492 A1      Jul. 11, 2019

Related U.S. Application Data

(60) Provisional application No. 62/383,512, filed on Sep. 5, 2016.

(51) Int. Cl.
*B60N 2/24* (2006.01)
*B60N 2/56* (2006.01)

(52) U.S. Cl.
CPC ............. *B60N 2/24* (2013.01); *B60N 2/5628* (2013.01); *B60N 2/5642* (2013.01); *B60N 2/5664* (2013.01)

(58) Field of Classification Search
CPC ...... B60N 2/24; B60N 2/5628; B60N 2/5642; B60N 2/5664; B60N 2/5621
USPC .......................... 297/180.1, 180.12, 180.14
See application file for complete search history.

(56) References Cited

U.S. PATENT DOCUMENTS

| 5,522,645 | A | * | 6/1996 | Dahlbacka | ............. | B60N 2/686 |
| | | | | | | 297/452.55 |
| 2007/0235993 | A1 | * | 10/2007 | Yoshikawa | .......... | B60N 2/4221 |
| | | | | | | 280/730.1 |
| 2011/0109128 | A1 | | 5/2011 | Axakov et al. | | |
| 2014/0367949 | A1 | | 12/2014 | Baron | | |
| 2016/0325655 | A1 | * | 11/2016 | Joshi | .................. | B60H 1/00285 |

FOREIGN PATENT DOCUMENTS

| DE | 1 700 844 U | 6/1955 |
| DE | 1 680 623 A1 | 12/1969 |
| DE | 7 115 094 U | 11/1975 |
| DE | 42 28 163 A1 | 3/1994 |
| DE | 100 56 045 A1 | 5/2002 |
| DE | 10 2007 031323 A1 | 1/2009 |
| DE | 11 2014 005039 T5 | 8/2016 |
| GB | 589675 A | 6/1947 |
| JP | 2004 261 414 A | 9/2004 |
| WO | 2005/051136 A1 | 6/2005 |

* cited by examiner

*Primary Examiner* — Mark R Wendell
(74) *Attorney, Agent, or Firm* — Marshall & Melhorn, LLC

(57) ABSTRACT

A vehicle seat and a vehicle, with the vehicle seat are provided. The vehicle seat includes a seat cushion, a backrest, and at least one of a cavity located under the seat cushion and a cavity located under the backrest. The at least one cavity includes at least one air intake, at least one air outlet, and at least one drain port.

15 Claims, 2 Drawing Sheets

VEHICLE SEAT AND VEHICLE

CROSS REFERENCE TO RELATED APPLICATIONS

This application is a United States National Phase Application of International Application PCT/EP2017/072175 filed Sep. 5, 2017, and claims the benefit of priority under of U.S. Provisional Application 62/383,512, filed, Sep. 5, 2016 the entire contents of which are incorporated herein by reference.

TECHNICAL FIELD

The present invention relates to a vehicle seat.
Further, the present invention relates to a vehicle.

TECHNICAL BACKGROUND

Vehicles with open chassis are generally known. Because of the open chassis it is possible that water intrudes into a passenger area and seats of the vehicle may get wet.

US 2014/0367949 A1 describes a seat for a golf cart comprising protective padded sleeves with specific functions.

GB 589,675 discloses a perforated seat shell for a tractor. The perforations improve seat climate and have a drainage function.

DE 1 680 623 A1 and DE 7 115 094 U both show a watertight seat with drainage channels on the outside.

DE 1 700 844 U describes a seat for a tractor with a foldable back rest. In an upright position of the back rest rain water is prevented from cumulating on the surface of a cushion by draining off through a clearance between the back rest and the cushion.

From JP 2004 261 414 A, a seat for a vehicle with an active ventilation is known. Ventilation holes are arranged in a front portion of a cushion of the seat for blowing hot air to an inside of knees of a passenger.

DE 100 56 045 A1 describes an actively ventilated seat with suction ports in a front portion of a cushion.

From DE 42 28 163 A1 a support for a seat surface or backrest surface of a seat is known. The support is intended for removing condensed liquid and is connected to a heating, ventilation and air conditioning (HVAC) or another active air supply. Alternatively a funnel is arranged in a front portion of a vehicle body so that the air supply happens via ram pressure if the vehicle moves.

SUMMARY

It is an object of the present invention to provide an improved vehicle seat and an improved vehicle.

According to the invention, a vehicle seat comprises a seat cushion, a backrest and at least one of a cavity located under the seat cushion and a cavity located under the backrest. The at least one cavity comprises at least one air intake, at least one air outlet, and at least one drain port. The arrangement of the at least one cavity with the air intake, the air outlet and the drain port allows removing entrapped water from the seat cushion and/or from a backrest cushion of the backrest and drying a wet seat cushion and/or a backrest cushion in a very efficient way. So the vehicle seat is particularly suitable for cars with open chassis.

For example the at least one cavity is defined between an underside of the seat cushion and a drip pan arranged below the seat cushion. This arrangement allows short ways for the water to drain off from the seat cushion.

To avoid a contact between the seat cushion and water in the cavity the seat cushion is kept away from the drip pan, e.g. by a suspension.

In a further embodiment of the vehicle seat, the at least one cavity is defined between an underside of the backrest and a drip pan arranged below the backrest. This arrangement allows short ways for the water to drain off from the backrest, particularly from the backrest cushion.

To enable an efficient drying in a further embodiment of the vehicle seat, the at least one air intake, air outlet and drain port are integrated in the drip pan.

In a further embodiment of the vehicle seat, the seat cushion comprises at least one drain channel directed from an upside to an underside. Thus water can drain off very easily from an upside of the seat cushion to the drip pan.

To achieve an efficient drying of a wet seat cushion, for example, the seat cushion comprises at least one air channel connected with the at least one cavity.

In another further embodiment of the vehicle seat, the backrest comprises a backrest cushion, wherein the backrest cushion comprises at least one drain channel directed from a backrest area to the at least one cavity. Thus water can drain off very easily from the backrest to the drip pan.

To achieve an efficient drying of a wet seat cushion, for example, the backrest cushion comprises at least one air channel connected with the at least one cavity.

According to the invention, a vehicle comprises at least one seat with a seat cushion, a backrest and at least one of a cavity located under the seat cushion and a cavity located under the backrest. The at least one cavity comprises at least one air intake, at least one air outlet, and at least one drain port. The arrangement of the at least one cavity with the air intake, the air outlet and the drain port allows removing entrapped water from the seat cushion and/or from a backrest cushion of the backrest and drying a wet seat cushion and/or a backrest cushion in a very simple way. So the vehicle offers improved comfort for a passenger.

To achieve a fast and efficient drying of the seat cushion and/or of the backrest cushion, for example, the at least one air intake is coupled with a heating, ventilation and air conditioning.

In a further embodiment of the vehicle, the at least one cavity is defined between an underside of the seat cushion and a drip pan arranged below the seat cushion. This arrangement allows short ways for the water to drain off from the seat cushion.

To enable a simple and efficient drying in a further embodiment of the vehicle the at least one air intake, air outlet and drain port are integrated in the drip pan.

In another embodiment of the vehicle, the at least one cavity is defined between an underside of the backrest and a drip pan arranged below the backrest. This arrangement allows short ways for the water to drain off from the backrest, particularly from the backrest cushion.

To enable an efficient drying in a further embodiment of the vehicle the at least one air intake, air outlet and drain port are integrated in the drip pan.

In a further embodiment of the vehicle, the seating cushion comprises at least one drain channel directed from an upside to an underside. Thus, water can drain off very easy from an upside of the seat cushion to the drip pan.

To achieve an efficient drying of a wet seat cushion in another embodiment of the vehicle, the seat cushion comprises at least one air channel connected with the at least one cavity.

In order to achieve that water can drain off very easily from the backrest to the drip pan and to achieve an efficient drying of a wet seat cushion, the backrest may comprise a backrest cushion comprising at least one of a drain channel directed from a backrest area to the at least one cavity and an air channel connected with the at least one cavity.

In a further embodiment the vehicle comprises an open chassis.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
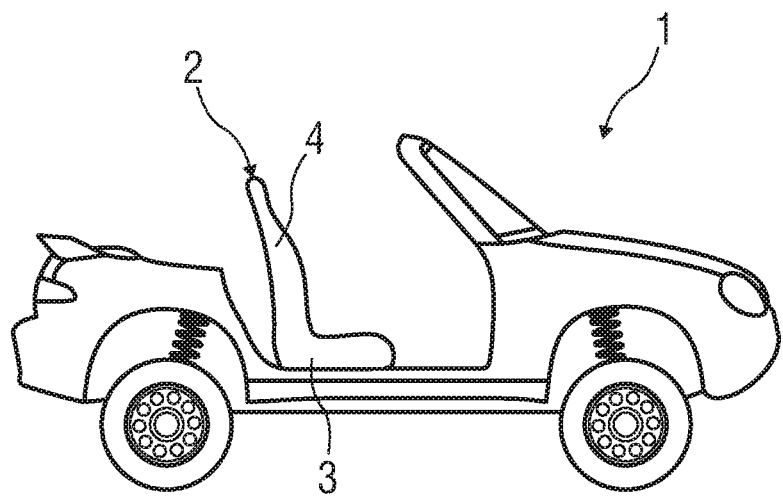
FIG. 1 is a schematic side view of a vehicle comprising a vehicle seat.

Referring to the drawings, FIG. 1 shows a schematic side view of a vehicle 1 comprising a vehicle seat 2. The vehicle 1 comprises an open chassis.

The vehicle seat 2 comprises a seat cushion 3 and a backrest 4.

Because of the open chassis it is possible that water intrudes into a passenger area and the vehicle seat 2 may get wet.

Figure 2:
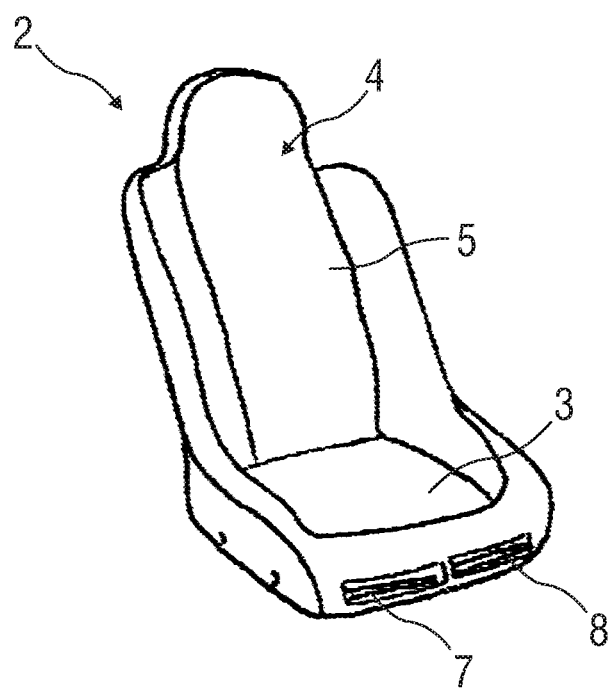
FIG. 2 is a schematic perspective view of a vehicle seat.
Figure 3:
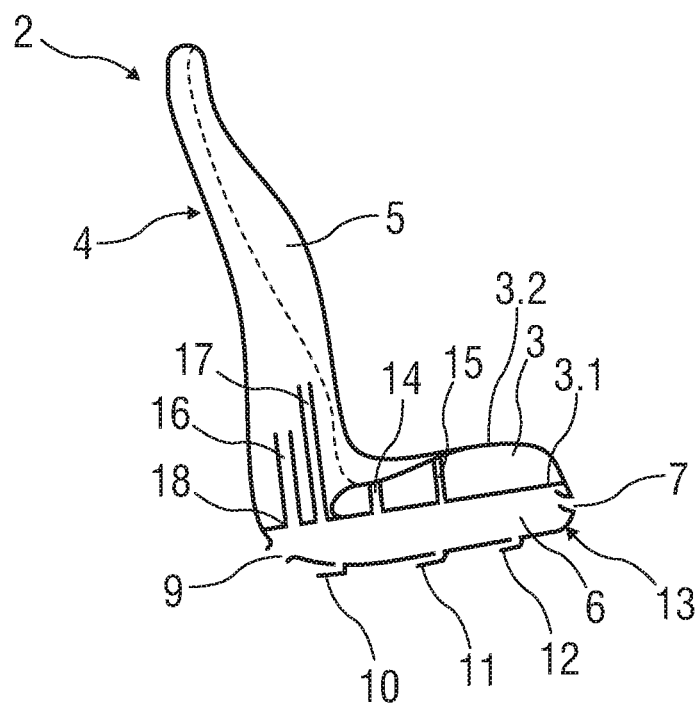
FIG. 3 is a schematic sectional view of a vehicle seat.
Figure 4:
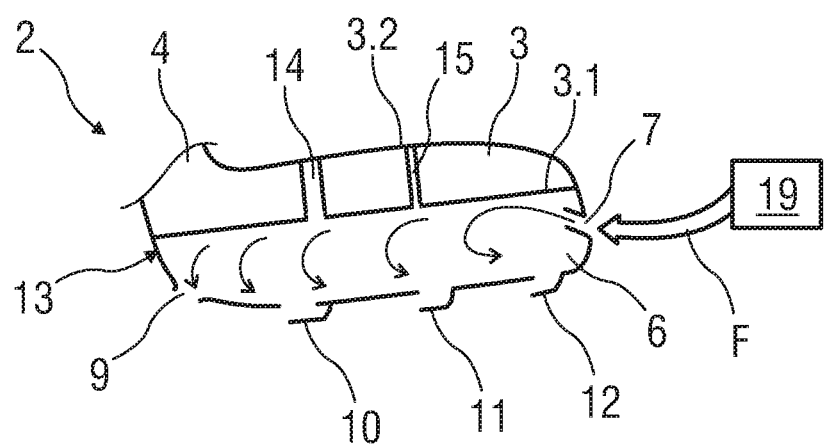
FIG. 4 is a schematic sectional view of a detail of a vehicle seat.

FIG. 2 shows a schematic perspective view of a vehicle seat 2, for example the vehicle seat 2 shown in FIG. 1. FIG. 3 shows a schematic sectional view of the vehicle seat 2 and FIG. 4 shows a schematic sectional view of a detail of a vehicle seat 2 within the range of the seat cushion 3.

The vehicle seat 2 comprises the seat cushion 3 and the backrest 4, wherein the backrest 4 comprises a backrest cushion 5.

Furthermore the vehicle seat 2 comprises a cavity 6 located under the seat cushion 3 and under the backrest 4.

The cavity 6 comprises at least one air intake 7, 8, in the shown embodiment two air intakes 7, 8, at least one air outlet 9 and at least one drain port 10, 11, 12, in the shown embodiment three drain ports 10, 11, 12. The at least one air intake 7, 8 is coupled with a heating, ventilation and air conditioning 19.

The cavity 6 is defined between an underside of the seat cushion 3, an underside of the backrest 4 and a drip pan 13 arranged below the seat cushion 3 and the backrest 4. The at least one air intake 7, 8, air outlet 9 and drain port 10, 11, 12 are integrated in the drip pan 13. In the shown embodiment the air intakes 7, 8 are arranged on a front side of the drip pan 13 and the air outlet 9 is arranged on a back side of the drip pan 13. The drain ports 10, 11, 12 are arranged on an underside of the drip pan 13. To avoid a contact between the seat cushion 3 and water in the cavity 6 the seat cushion 3 is kept away from the drip pan 13, e.g. by a suspension 18.

Furthermore, the seat cushion 3 comprises at least one drain channel 14 directed from an upside 3.2 to the underside 3.1. Additionally, the seat cushion comprises at least one air channel 15 connected with the cavity 6.

Moreover, the backrest cushion 5 comprises at least one drain channel 16 directed from a backrest area to the cavity 6 and at least one air channel 17 connected with the cavity 6.

When the vehicle seat 2 gets wet, for example from rain, the water is drained through the drain channels 14, 16 in the drip pan 13 and gets out through the drain ports 10, 11, 12.

To dry the wet seat cushion 3 and the wet backrest cushion 5 the cavity is charged with an air flow F from the heating, ventilation and air conditioning 19. The air flow F flows through the air channels 15, 17, collects the remaining moisture and takes it away through the air outlet 9. To prevent the cavity from intrusion of moist air, the air outlet 9 is designed as a one-way vent in a possible embodiment.

While specific embodiments of the invention have been shown and described in detail to illustrate the application of the principles of the invention, it will be understood that the invention may be embodied otherwise without departing from such principles.

The invention claimed is:

1. A vehicle seat comprising:
   a seat cushion;
   a backrest; and
   at least one of a cavity located under the seat cushion and a cavity located under the backrest,
   the at least one cavity comprising:
      at least one air intake;
      at least one air outlet; and
      at least one drain port;
      wherein the at least one cavity is defined between an underside of the seat cushion and a drip pan arranged below the seat cushion,
      wherein the at least one air intake, air outlet and drain port are integrated in the drip pan.

2. A vehicle seat according to claim 1, wherein the at least one cavity is defined between an underside of the backrest and a drip pan arranged below the backrest.

3. A vehicle seat according to claim 1, wherein the seat cushion comprises at least one drain channel directed from an upside to an underside.

4. A vehicle seat according to claim 1, wherein the seat cushion comprises at least one air channel connected with the at least one cavity.

5. A vehicle seat according to claim 1, wherein the backrest comprises a backrest cushion.

6. A vehicle seat according to claim 5, wherein the backrest cushion comprises at least one drain channel directed from a backrest area to the at least one cavity.

7. A vehicle seat according to claim 5, wherein the backrest cushion comprises at least one air channel connected with the at least one cavity.

8. A vehicle comprising:
   at least one seat, the seat comprising:
   a seat cushion;
   a backrest; and
   at least one of a cavity located under the seat cushion and a cavity located under the backrest, the at least one cavity comprising:
      at least one air intake;
      at least one air outlet; and
      at least one drain port;
      wherein the at least one cavity is defined between an underside of the seat cushion and a drip pan arranged below the seat cushion, wherein the at least one air intake, air outlet and drain port are integrated in the drip pan.

9. A vehicle according to claim 8, wherein the at least one air intake is coupled with a heating, ventilation and air conditioning device.

10. A vehicle according to claim 8, wherein the at least one cavity is defined between an underside of the backrest and a drip pan arranged below the backrest.

11. A vehicle according to claim 8, wherein the seat cushion comprises at least one drain channel directed from an upside to an underside.

12. A vehicle according to claim 8, wherein the seat cushion comprises at least one air channel connected with the at least one cavity.

13. A vehicle according to claim 8, wherein the backrest comprises a backrest cushion comprising at least one of: a drain channel directed from a backrest area to the at least one cavity; and an air channel connected with the at least one cavity.

14. A vehicle according to claim 8, comprising an open chassis.

15. A vehicle seat comprising:
a seat cushion;
a backrest; and
at least one of a cavity located under the seat cushion and a cavity located under the backrest,
the at least one cavity comprising:
at least one air intake;
at least one air outlet; and
at least one drain port;
wherein the at least one cavity is defined between an underside of the backrest and a drip pan arranged below the backrest, and
wherein the at least one air intake, the at least one air outlet and the at least one drain port are integrated in the drip pan.

\* \* \* \* \*